Patented June 24, 1924.

1,498,708

UNITED STATES PATENT OFFICE.

CLARENCE P. WILSON, OF CORONA, CALIFORNIA, ASSIGNOR TO CALIFORNIA FRUIT GROWERS EXCHANGE, OF LOS ANGELES, CALIFORNIA, A CORPORATION OF CALIFORNIA.

PROCESS OF PRODUCING DECOLORIZING MATERIAL.

No Drawing. Application filed April 11, 1921. Serial No. 460,483.

*To all whom it may concern:*

Be it known that I, CLARENCE P. WILSON, a citizen of the United States, and a resident of Corona, in the county of Riverside and State of California, have invented a certain new and useful Process of Producing Decolorizing Material, of which the following is a specification.

The invention relates to processes for producing a filtering medium capable of decolorizing liquids passing therethrough.

An object of the invention is to provide for rapid filtration and decoloration of liquids.

Another object is to provide for rapid filtration and decoloration of viscous liquors.

Another object is to provide a process whereby there is produced under relatively high pressure a porous structure which will permit of rapid filtration of liquids, even though the liquids be extremely viscous. An example of a viscous liquor which can be rapidly filtered and decolorized by passing it through the filtering medium produced by this invention is a saturated or super-saturated solution of citric acid.

Another object is to provide a process whereby carbon in a finely divided condition is distributed over a relatively large surface, so that the filtering medium presents to the solution being filtered an unusually large active surface of carbon particles to absorb coloring matter and other impurities from the liquids or solutions being treated.

The process deals, in general, with the impregnation of an inert refractory porous material with organic matter, and more particularly the process involves the more thorough impregnation of such refractory material with the organic matter by the application of pressure. In the broader phases of the invention, it matters not what the refractory material consists of.

In the practice of my process, an inert porous refractory material, generally in the form of a coarse powder, is mixed with a liquid containing a fairly large proportion of finely suspended organic solids and the mixture is raised in temperature to substantially the boiling point. Thereupon the heating is discontinued and the finely suspended organic matter settles with the refractory material to the bottom of the container, leaving the supernatant liquid practically clear. The actual proportion of the refractory material and organic matter used varies in practice, for example, from about three to about twenty pounds of the refractory material to each one hundred gallons of the liquid containing the organic matter, depending largely on the amount of suspended organic material in the liquid.

The boiling referred to above has the effect of producing coagulation of all or part of the albumins, pectic substances and whatever other organic substances or compounds there may be in the liquid. During the heating and boiling of the mixture, the coagulated particles are very thoroughly distributed over the inner, as well as the outer surfaces of the porous refractory material.

After the preliminary mixing and distribution of the organic particles upon and within the refractory material, the mixture is passed into a suitable filter press in which the pressure can be raised as high as is deemed desirable. For example, the pressure may be as low as five pounds per square inch or it may be as high as one thousand pounds per square inch. The higher the pressure the more thoroughly will the refractory material be impregnated with the organic matter. In practice, the pressure ordinarily employed varies from forty to sixty pounds per square inch, the average being about fifty pounds per square inch.

Instead of using a liquid containing organic matter, I may mix the refractory material with organic matter in pulp form and apply pressure in any suitable manner to cause the organic matter to penetrate the pores of the refractory material. For example, the mixture of pulp and refractory material may be charged into a cylinder closed at one end and provided with a piston, and hydraulic or other power may be applied to the piston to obtain the desired results. The product may be termed "press cake."

After the filter press is full, the excess liquid is removed, for example, by compressed air, and the press cake is then dumped from the press. This press cake ordinarily contains approximately equal parts by weight of the refractory material and wet mass or pulp of organic matter.

The press cake may be retorted in this condition, but it is preferable, because more economical in commercial practice, to remove practically all of the moisture from the press cake by the utilization of waste flue gases, exhaust steam or other economical sources of heat before charging the cake into the retort.

A retort of any suitable construction is charged with the press cake and the retort is so operated as to expel vapour and gases and prevent the entrance of air. The temperature of the retort is gradually raised by the application of heat produced by any suitable form of fuel, or electric heat may be applied. As the temperature of the retort rises, the watery vapour is given off and is expelled from the retort until the mass becomes dry, and then destructive distillation begins. Gases, pyroligneous acid, oil and, finally, tar are driven out of the mass in the retort. The volatile products thus given off are valuable and it is, therefore, desirable to condense them.

Heat is applied to the retort to bring the contents thereof to a bright red heat for a length of time sufficient to drive off substantially all of the hydrocarbons, some of which are tenaciously held because of adsorption by the refractory material and by the carbon produced in the retorting operation.

While the volatile products are being driven off and removed, carbon, produced by the application of heat to the organic matter, with which the refractory material is thoroughly impregnated, is deposited in a very finely divided form on the inner, as well as the outer, surfaces of the refractory material. Owing to the thorough impregnation of the refractory material with the organic particles, as described above, and particularly because the impregnation is accomplished in part by the application of pressure, the carbon particles occur throughout the refractory material, thus producing a relatively great area of carbon surface, so that when the product resulting from the performance of this process is applied as a decolorizing material or employed as a filtering medium the large carbon surface is available and is effective in adsorbing coloring matter, colloidal particles and other very minute suspended particles in the liquid being treated.

Temperatures of the mass in the retort as high as 650° C. to 900° C. have been employed and, preferably, the mass is maintained at such temperature for from fifteen to thirty minutes. An even greater temperature than 900° C. is not harmful and may be applied for a longer time with good results, when the production and maintenance of such high temperature is not too expensive.

After the foregoing operations have been effected to produce a carbonized mass, said mass may be allowed to cool in the retort in order that it may not come in contact with air before it cools to a temperature less than that of ignition. Or, if desired, any of the usual methods of quenching the carbons produced by destructive distillation of organic matter may be successfully used.

The carbonized mass may then be broken up and screened so as to produce a powder of uniform size. A product passing a forty mesh screen has been found to give good results when used as a decolorizer for citric acid liquors, but other sizes of powder grains may be employed, depending upon the kind of liquids that are being treated for decoloration and filtration.

As an example of an inorganic refractory material which has been used with good results in the performance of this new process, I have employed kieselguhr in the form of a course powder, using about ten pounds of kieselguhr to one hundred gallons of liquid.

The liquid, containing the organic matter, which I prefer to employ at present is lemon or other citrus fruit juice, so pressed that it contains a fairly large proportion of finely suspended organic solids. The boiling of this juice with the kieselguhr or other refractory material employed causes the coagulation of all or part of the albumins, pectic substances and possibly other organic substances and compounds as mentioned above. Orange juice can be used or lemon and orange juice can be used together.

When the juice is removed from lemons or oranges by a pressing operation, there remains a wet pulp. This pulp is preferably ground to any desired degree of fineness and the ground pulp may be kneaded or mixed with the wet filter press cake and this mixture may then be retorted in the manner described above for retorting the press cake alone. When the pulp is thus used, the carbonized product is richer in decolorizing carbon than that produced from the use of the press cake alone, since there is a greater proportion of organic matter in the raw mix.

The ground pulp mentioned above may, if desired, be added to the juice, and the mixture of juice, pulp and refractory material may then be boiled, and after boiling may be compressed to produce the press cake for retorting. In this manner, a still more thorough mixture is secured and the impregnation of the refractory material with the organic matter is very thorough.

From the foregoing, it will be clear that an important feature of the invention is the impregnation of the inert material with the organic matter by applying pressure prior to carbonization. Another important feature is the employment of citrus fruit juices, or citrus fruit pulps or a mixture of such juices and pulps, as the organic material constituting the source of the carbon to be deposited. A further feature of the invention is the production of the decolorizing material by carbonizing a mixture of citrus juice or pulp or both juice and pulp with kieselguhr.

The product produced by the process above described possesses unusual advantages as a decolorizer and filtering medium in that the product retains its porous structure, even though relatively high pressure be employed in the filter press, cylinder or other apparatus employed for producing the press cake, the porosity of the product permitting of rapid filtration through it of the liquid being treated, even though the liquid be highly viscous.

I claim:

1. In a process of producing decolorizing material, the combined operations of mixing together porous refractory material and organic matter, applying pressure to the mixture to cause thorough impregnation of the refractory material with the organic matter, and then applying sufficient heat to the mass to drive off the volatile matter and cause the deposition of a decolorizing carbon within the refractory material.

2. In a process of producing decolorizing material, the combined operations of mixing together porous refractory material and a liquid containing suspended organic solids, heating the mixture, applying pressure to the mixture to cause thorough impregnation of the refractory material with the organic matter, and then applying sufficient heat to drive off the volatile matter and cause the deposition of a decolorizing carbon within the refractory material.

3. In a process of producing decolorizing material, the combined operations of pressing a mixture of kieselguhr and organic matter to thoroughly impregnate the kieselguhr with the organic matter, and applying sufficient heat to the mass to drive off the volatile matter and cause the deposition of a decolorizing carbon within the kieselguhr.

4. In a process of producing decolorizing material, the combined operations of impregnating porous refractory material with organic matter derived from citrus fruit, and then applying sufficient heat to the mass to drive off the volatile matter and cause the deposition of a decolorizing carbon within the refractory material.

5. In a process of producing decolorizing material, the combined operations of mixing together porous refractory material and citrus fruit juice containing suspended organic solids, heating the mixture to cause coagulation of at least a part of the albumins, separating the solids from the excess liquid, and then applying sufficient heat to the mass to drive off the volatile matter and cause the deposition of a decolorizing carbon within the refractory material.

6. In a process of producing decolorizing material, the combined operations of mixing together porous refractory material and organic matter, applying pressure to the mixture to cause thorough impregnation of the refractory material with the organic matter, drying the mass, distilling off volatile matter, and heating the mass to above 650° C.

7. In a process of producing decolorizing material, the combined operations of mixing together porous material and organic matter, applying pressure of 10 to 1000 pounds per square inch to thoroughly impregnate the refractory material with the organic matter, drying the mass, distilling off the volatile matter, and heating the mass to above 650° C., until a decolorizing carbon is produced.

8. In a process of producing decolorizing material, the combined operations of mixing together porous material and organic matter, applying pressure of 10 to 1000 pounds per square inch to thoroughly impregnate the refractory material with the organic matter, drying the mass, distilling off the volatile matter, heating the mass to above 650° C., until a decolorizing carbon is produced and cooling the carbon out of contact with the air.

9. In a process of producing a de-colorizing material, the combined operations of filtering a fluid suspension of organic matter through kieselguhr, applying pressure to thoroughly impregnate said organic matter into the kieselguhr, distilling off the volatile matter and heating the mass to over 650° C. until a decolorizing carbon is produced.

Signed at Corona, Calif. this 4 day of April 1921.

CLARENCE P. WILSON.

Witnesses:
 ELOISE JAMESON,
 F. N. TAYLOR.